US006846208B1

(12) United States Patent
Goldmeer et al.

(10) Patent No.: US 6,846,208 B1
(45) Date of Patent: Jan. 25, 2005

(54) WAVE ROTOR BASED POWER AND PROPULSION GENERATION FOR A MARINE VESSEL

(75) Inventors: Jeffrey Scott Goldmeer, Latham, NY (US); Chellappa Balan, Niskayuna, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/700,122

(22) Filed: Nov. 3, 2003

(51) Int. Cl.$^7$ .............................................. B63H 21/20
(52) U.S. Cl. ............................................. 440/3; 440/4
(58) Field of Search ................................. 440/3, 4, 84

(56) References Cited

U.S. PATENT DOCUMENTS

| 4,424,042 | A | | 1/1984 | Gongwer |
| 5,702,273 | A | | 12/1997 | Cho et al. |
| 6,351,934 | B2 | | 3/2002 | Snyder |
| 6,449,939 | B1 | | 9/2002 | Snyder |
| 6,460,342 | B1 | | 10/2002 | Nalim |
| 6,526,936 | B2 | | 3/2003 | Nalim |
| 6,555,928 | B1 | * | 4/2003 | Mizuno et al. ........... 290/40 C |
| 6,584,764 | B2 | | 7/2003 | Baker |
| 6,610,193 | B2 | | 8/2003 | Schmitman |
| 2002/0039673 | A1 | * | 4/2002 | Garris ........................ 429/25 |
| 2002/0068250 | A1 | | 6/2002 | Nalim |
| 2003/0029162 | A1 | | 2/2003 | Baker |
| 2003/0079713 | A1 | | 5/2003 | Nalim |
| 2004/0065489 | A1 | * | 4/2004 | Aberle et al. .............. 180/65.1 |
| 2004/0068981 | A1 | * | 4/2004 | Siefker et al. ................ 60/262 |

OTHER PUBLICATIONS

Greendyke, R.B., et al., "Dynamic Simulation of a Wave Rotor Topped Turboshaft Engine", NASA Technical Memorandum 107514 (1997), pp. 1–9.

Jones, S.M., et al., "Performance Benefits for Wave Rotor--Topped Gas Turbine Engines", American Society of Mechanical Engineers (1996), pp. 1–11.

Nalim, M.R., "Pulse Combustion and Wave Rotors for High–Speed Propulsion Engines", American Institute of Aeronautics and Astronautics (1998), pp. 1–8.

Welch, G.E., et al., "Wave Rotor–Enhanced Gas Turbine Engines", NASA Technical Memorandum 106998 (1995), pp. 1–13.

Welch, G.E., et al., "Wave–Rotor–Enhanced Gas Turbine Engine Demostrator", NASA Technical Memorandum 1999–209459 (1999), pp. 1–10.

Wilson, J., et al., "Transmission and Incidence Losses for a Slotted Plate", American Institute of Aeronautics and Astronautics (1998), pp. 1–10.

Wilson, J., et al., "Jet Engine Performance Enhancement Through Use of a Wave–Rotor Topping Cycle", NASA Technical Memorandum 4486 (1993), pp. 1–10.

Wilson, J., et al., "Wave Rotor Optimization for Gas Turbine Engine Topping Cycles", AIAA Journal of Propulsion and Power (1996), vol. 12, No. 4, pp. 778–785.

* cited by examiner

Primary Examiner—Stephen Avila
(74) Attorney, Agent, or Firm—Scully, Scott, Murphy & Presser

(57) ABSTRACT

A hybrid power and propulsion generation system for a marine vessel is provided that combines a fuel cell with a wave rotor/combustor. A wave rotor that uses gas dynamics (shock and expansion) processes within rotating passages, using a hydrogen and oxygen supply in fluid communication with the wave rotor, is combined with a regenerative fuel cell for power generation for an underwater vessel.

20 Claims, 2 Drawing Sheets

WAVE ROTOR BASED POWER AND PROPULSION GENERATION FOR A MARINE VESSEL

BACKGROUND OF THE INVENTION

1. Field of the Invention

The present invention relates to power generation systems for marine vessels, and more specifically, to an invention capable of combining a fuel cell and a wave rotor into a hybrid power and propulsion generation system for an underwater vessel.

2. Prior Art

Vehicles that operate underwater are useful for performing tasks below the sea surface in such fields as deep-water salvage operations, navy and marine operations, underwater telecommunications, offshore petroleum and mining, and oceanographic research. Many of these applications are completed by small-scale underwater vehicles that can be either manned or unmanned (remotely operated). The unmanned vehicles are commonly known as Unmanned Underwater Vehicles (UUVs).

Generally, these small-scale underwater vessels have used conventional power systems. These conventional power/propulsion generation systems for underwater vessels have been limited to electrochemical systems, such as batteries or fuel cells, which have provided low speed operation of the underwater vessels. Current power/propulsion technology for underwater vessels do not have the capacity to provide the sustained high power required by the next generation of underwater vehicles.

For example, power in a manned or unmanned underwater vessel typically comes from an on-board power supply such as a battery. Because this on-board power supply has a limited propulsion capacity, tasks requiring a quick getaway in which a vehicle needs a sustained high velocity escape from an undesirable situation (i.e. encounter with the enemy), are not attainable using the conventional power/propulsion generation systems.

Traditional marine propulsion systems generally include an energy source, such as a battery or AC generator, a power conversion means for converting the current output of the energy source, an electric motor, a coupling system for transferring the motor output, which includes shafts, bearings and linkages, a propulsor for imparting thrust to the vehicle, and a cooling system for removing waste heat from the assembly. The cooling system typically includes a circulation pump, a heat exchanger and piping.

Examples of such conventional propulsion systems can be found in U.S. Pat. No. 5,702,273 and U.S. Pat. No. 4,424,042. These patents provide propulsion systems for underwater vehicles. However, these propulsion systems are powered by A.C. power sources and conventional battery systems, and such conventional propulsion systems do not provide for a sustained high power when the marine vessels require a high speed in certain situations.

SUMMARY OF THE INVENTION

Therefore, it is an object of the present invention to provide a marine vessel capable of providing both power for low-speed, stealthy operations, and a high-power option when high speed is required.

Accordingly, an apparatus for a hybrid power generation system that provides for a high power in marine vessels is provided. The apparatus for a hybrid power generation system comprises a fuel cell for powering the marine vessel when a low speed is required by the marine vessel, and a wave rotor for powering the marine vessel in combination with the fuel cell when a high speed is required by the marine vessel. Oxygen is injected from an oxygen supply to the wave rotor, and hydrogen is injected from a hydrogen supply to the wave rotor, to initiate a combustion reaction between the oxygen and the hydrogen when the high speed is required by the marine vessel. An advantage of the wave rotor technology in comparison to standard combustion systems is that the heat load on the system is not continuous, reducing the cooling requirements.

The hybrid power generation system further comprises high temperature high pressure steam formed by the combustion reaction, which is ducted from the wave rotor to a steam turbine, where it is expanded to rotate a shaft of the turbine. The rotating shaft is used to generate electricity for a motor drive of the marine vessel in one embodiment. The rotating shaft is used to turn gear sets of a gear and clutch system of the marine vessel in a separate embodiment. High temperature low pressure steam generated by the steam turbine is ducted into a condenser, which is used to condense the steam into liquid water, which is then stored in an onboard tank.

The fuel cell can be a regenerative fuel cell. The fuel cell is used for powering the motor of the marine vessel when the marine vessel requires a low speed. The by-product of the fuel cell is water, which is stored in an onboard tank. The fuel cell and the wave rotor are simultaneously used for powering the motor of the marine vessel when the marine vessel requires a high speed.

The marine vessel can be an underwater vessel, which can be either manned or unmanned. The fuel cell uses the hydrogen supply and oxygen supply to produce electricity to power the motor of the marine vessel. Using electricity supplied by an outside power supply, the regenerative fuel cell can reduce the water stored in the onboard tank back into hydrogen and oxygen, which is stored back into the hydrogen supply and the oxygen supply, respectively.

Further, a hybrid power generation method for a marine vessel is provided comprising powering a motor of the marine vessel by a fuel cell when a low speed is required by the marine vessel, and powering a motor of the marine vessel by a wave rotor in combination with the fuel cell when a high speed is required by the marine vessel. The step of powering the motor of the marine vessel when a high speed is required further comprises injecting oxygen into the wave rotor, and then injecting hydrogen into the wave rotor, thereby initiating a combustion reaction between the oxygen and the hydrogen.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

These and other features, aspects, and advantages of the apparatus and methods of the present invention will become better understood with regard to the following description, appended claims, and accompanying drawing where:

DETAILED DESCRIPTION OF THE INVENTION

Although this invention is applicable to numerous and various types of power generation and propulsion systems for marine vessels, it has been found particularly useful in the environment of power generation systems for small-scale underwater vessels and UUVs. Therefore, without limiting the applicability of the invention to underwater vessels, the invention will be described in such environment.

Figure 1:
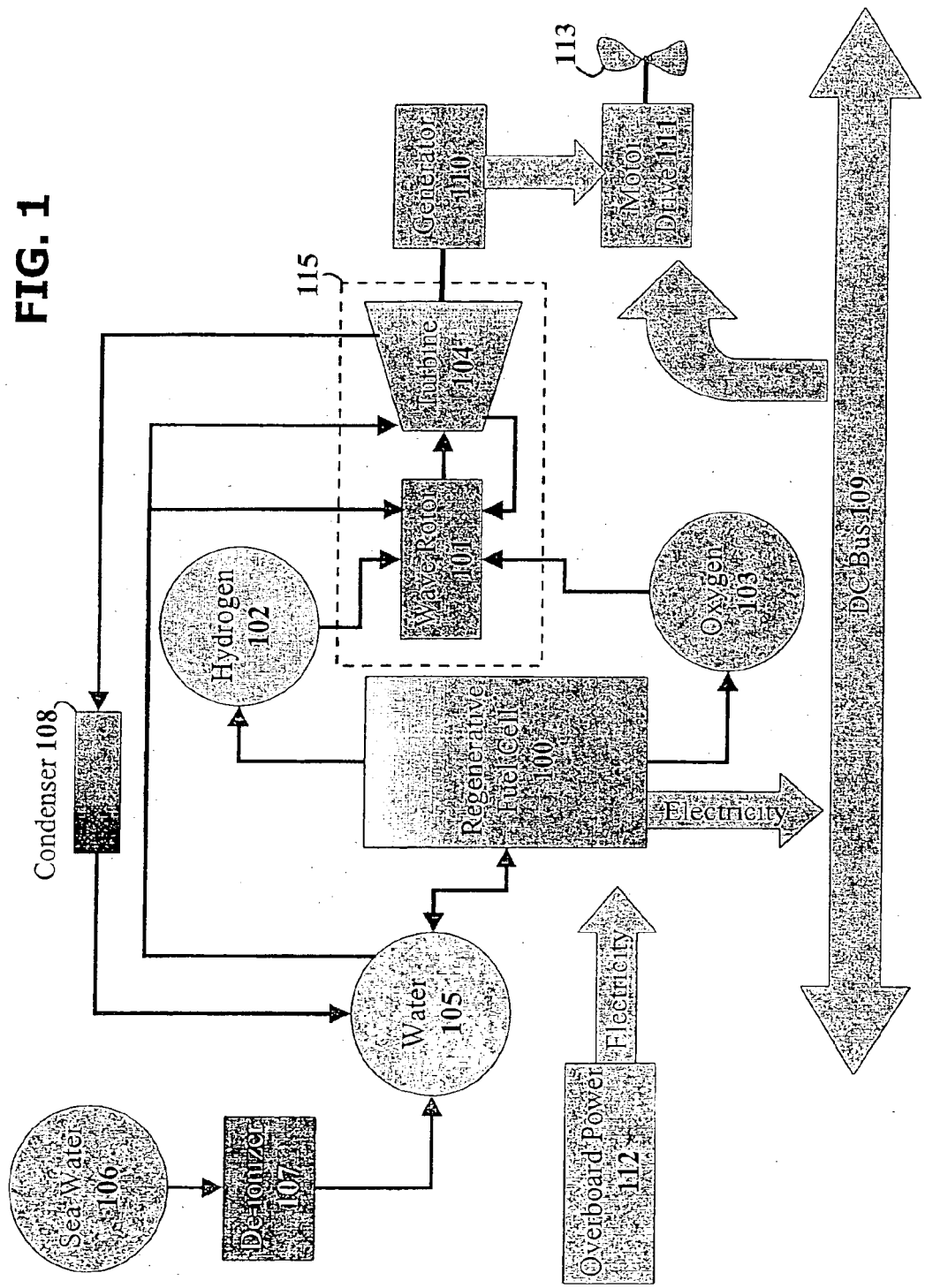
FIG. 1 illustrates a schematic representation of a first embodiment of a system for carrying out an implementation of the present invention.

With reference to FIG. 1, there is a schematic representation of a closed loop power/propulsion generation system for an underwater vehicle. Hydrogen is stored in a hydrogen tank 102 and oxygen is stored in an oxygen tank 103. The hydrogen tank 102 and the oxygen tank 103 are in fluid communication with a fuel cell 100. Seawater 106 is de-ionized through a de-ionizer 107 and stored in a water tank 105. The hydrogen and oxygen gases stored in the hydrogen tank 102 and the oxygen tank 103, respectively, are the reactants for the regenerative fuel cell 100 that produces electricity and water as a by-product. The electricity is provided to a DC bus 109, and the water by-product is stored in the water tank 105 for later conversion back into $H_2$ and $O_2$.

The stored water in the water tank 105 can be converted back into $H_2$ and $O_2$ by running the regenerative fuel cell 100 as an electrolysis system, which would require electrical power be fed by an outside or overboard power supply 112. If an external power source such as the overboard power supply 112 is used to feed electricity back into the fuel cell 100, the fuel cell 100 would reduce the water from the water tank 105 back into $H_2$ and $O_2$. Thus, this is a regenerative system, in which an external power source is used to re-charge the regenerative fuel cell 100.

The wave rotor 101 is composed of a combined wave rotor and combustor. The wave rotor/combustor 101 utilizes cyclic transient gas dynamic processes to top the engine's basic cycle through the use of shock waves, expansion waves and hot to cold working fluid interfaces. Oxygen is injected from the oxygen tank 103 into the wave rotor portion of the wave rotor/combustor 101, which isentropically compresses the oxygen and increases the temperature and pressure until the oxygen obtains supersonic velocities. Hydrogen is then injected from the hydrogen tank 102 into the wave rotor/combustor 101 and a combustion reaction is initiated, forming high temperature high pressure steam. An appropriate control system is used to regulate the amount of oxygen and hydrogen to be injected into the wave rotor 101. Water from the water tank 105 can be used to cool the wave rotor 101 if necessary.

The high temperature high pressure steam generated by the wave rotor/combustor 101 is ducted to a steam turbine 104, which expands the high temperature high pressure steam to generate power. The shaft of the turbine 104 is connected to a generator 110 that is directly connected to a motor drive 111. The generator can also be connected to the DC bus 109. In the present embodiment, the electrical power from the generator 110 is sent directly to the motor drive 111, which drives the propulsion system 113. High temperature low pressure steam exiting the steam turbine 104 is ducted to a condenser 108, which is used to condense the steam into liquid water, which is stored in the water tank 105. The cooling fluid used by the condenser 108 could be seawater, which is nearly in infinite supply for an underwater vessel.

The process of compressing the oxygen in the wave rotor 101 requires that work be performed on the gas. However, this work is less than the work output from the steam turbine 104. The net result is that the closed loop power/propulsion generation system 115 generates work.

This system is more efficient than standard combustion reaction systems, thus providing a more efficient power/propulsion generation system. The coupling of the regenerative fuel cell 100 and the wave rotor/combustor 101 provides for nominal steady state power when nominal power is required, by using the power in the fuel cell 100, and provides for instantaneous high power when a high power is required, by using the hybrid power of the wave rotor/combustor 101 and fuel cell 100.

The fuel cell 100 can operate independently of the wave rotor/combustor 101 or simultaneously with the wave rotor/combustor 101. The fuel cell 100 is used by the underwater vessel for operational modes requiring low power and the wave rotor/combustor 101 is used by the underwater vessel for operational modes requiring high power. The fuel cell 100 continues to operate at all times to provide the basic minimum power required by the underwater vessel.

When the underwater vessel requires a low power, then electrical power is provided to the motor drive 111 by DC bus 109. When the underwater vessel requires a high power, then the fuel cell 100 will operate at its maximum power and the wave rotor/combustor 101 will supplement the fuel cell 100 during high power operation. Electrical power is provided by both the generator 110, and the DC bus 109, to the motor drive 111 when a high speed is required. The appropriate amounts of oxygen and hydrogen are injected into the wave rotor/combustor 101 from the hydrogen supply 102 and the oxygen supply 103 accordingly.

Figure 2:
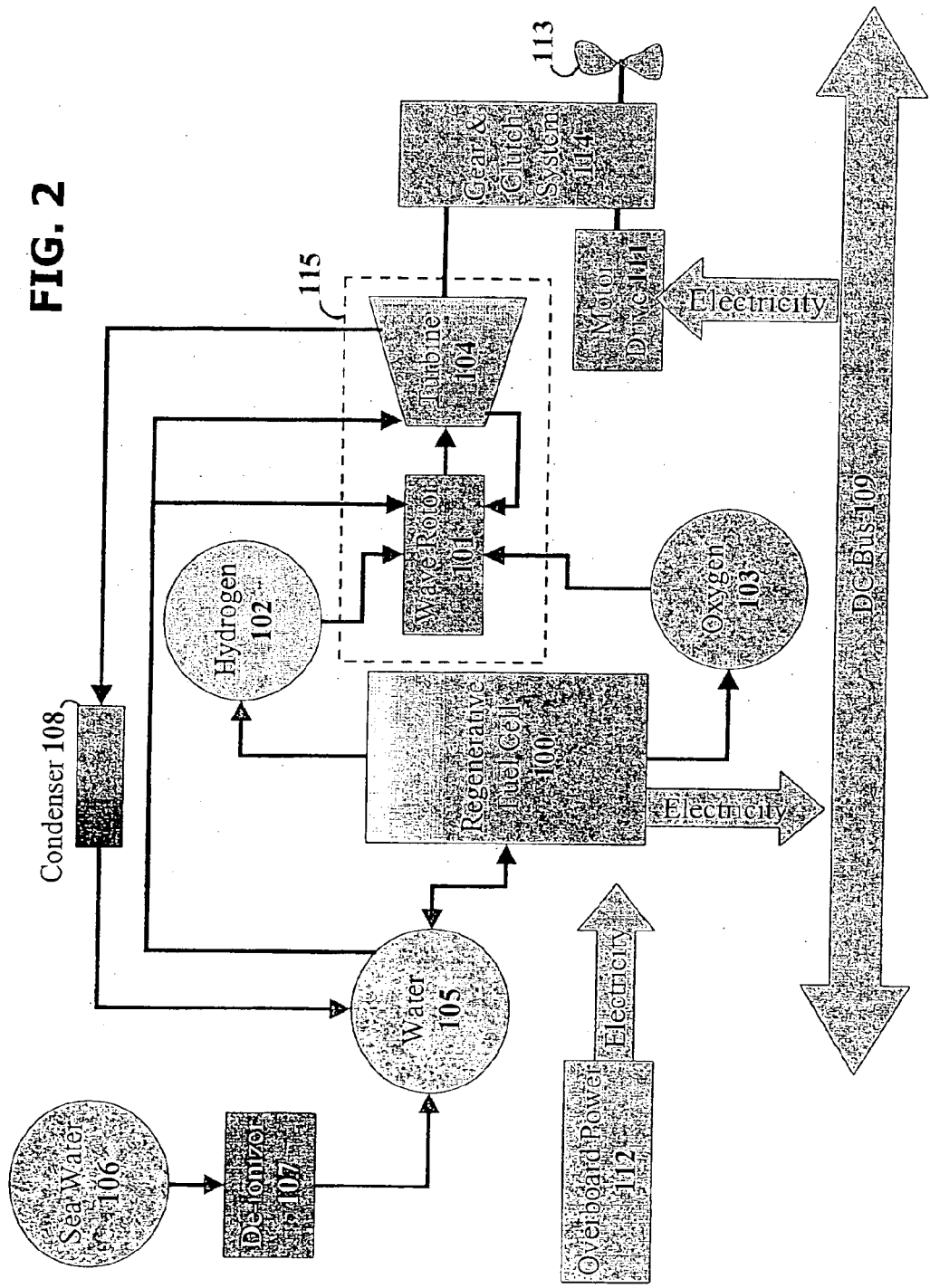
FIG. 2 illustrates a schematic representation of a second embodiment of a system for carrying out an implementation of the present invention.

A second embodiment of the present invention is provided in FIG. 2. This embodiment is similar to the first embodiment, except that propulsion at high speed is derived from a direct-drive system. The shaft of the turbine 104 is connected to a gear and clutch system 114. At low speeds, the motor drive 111 drives the propulsion system 113. When a high speed is required, then the gear and clutch system is engaged and the turbine shaft of the turbine 104 turns the gear sets and the propulsion system 113.

The above descriptions of the present invention are only two of the embodiments of the invention. Various other combinations of marine vessels are also possible, in which the marine vessel can be either manned or unmanned.

The present invention provides several advantages that solves the problems with prior art methods. It provides nominal steady power when the marine vessel requires a low speed, or a high power when the marine vessel requires a high speed, without exhausting the battery, by using the fuel cell when a low speed is required, and initiating a combustion reaction with the wave rotor when a high speed is required.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An apparatus for a hybrid power generation system for a marine vessel comprising:
   a fuel cell for powering said marine vessel when a low speed is required by said marine vessel; and
   a wave rotor for powering said marine vessel in combination with said fuel cell when a high speed is required by said marine vessel.

2. The apparatus for a hybrid power generation system of claim 1, wherein oxygen is injected from an oxygen supply into said wave rotor, and hydrogen is injected from a hydrogen supply into said wave rotor, to initiate a combustion reaction between said oxygen and said hydrogen when said high speed is required by said marine vessel.

3. The apparatus for a hybrid power generation system of claim 2, wherein high temperature high pressure steam and high temperature low pressure steam are formed by said combustion reaction.

4. The apparatus for a hybrid power generation system of claim 3, wherein said high temperature high pressure steam is ducted from said wave rotor to a turbine and expanded to rotate a shaft of said turbine.

5. The apparatus for a hybrid power generation system of claim 4, wherein a generator uses said rotating turbine shaft to generate electricity for a motor drive, wherein said motor drive drives a propulsion system for said marine vessel.

6. The apparatus for a hybrid power generation system of claim 4, wherein a gear and clutch system uses said rotating turbine shaft to turn gear sets of said gear and clutch system to drive a propulsion system for said marine vessel.

7. The apparatus for a hybrid power generation system of claim 1, wherein said fuel cell is used for driving a propulsion system of said marine vessel when said low speed is required by said marine vessel.

8. The apparatus for a hybrid power generation system of claim 1, wherein said fuel cell and said wave rotor are simultaneously used for driving a propulsion system of said marine vessel when a high speed is required by said marine vessel.

9. The apparatus for a hybrid power generation system of claim 3, wherein said high temperature low pressure steam is condensed by a condenser into water to be used by said fuel cell.

10. The apparatus for a hybrid power generation system of claim 2, wherein said fuel cell uses hydrogen from said hydrogen supply and oxygen from said oxygen supply to produce electricity to power a motor drive of said marine vessel.

11. The apparatus for a hybrid power generation system of claim 9, wherein said fuel cell is a regenerative fuel cell that uses electricity supplied by an outside power supply to reduce the water into hydrogen and oxygen.

12. The apparatus for a hybrid power generation system of claim 11, wherein said hydrogen is stored in said hydrogen supply and said oxygen is stored in said oxygen supply.

13. The apparatus for a hybrid power generation system of claim 1, wherein said marine vessel is an underwater vessel.

14. The apparatus for a hybrid power generation system of claim 13, wherein said underwater vessel is manned.

15. The apparatus for a hybrid power generation system of claim 13, wherein said underwater vessel is unmanned.

16. A hybrid power generation method for a marine vessel, the method comprising:
   powering a motor of said marine vessel by a fuel cell when a low speed is required by said marine vessel; and
   powering a motor of said marine vessel by a wave rotor in combination with said fuel cell when a high speed is required by said marine vessel.

17. The hybrid power generation method of claim 16, wherein the step of powering said motor of said marine vessel when a high speed is required further comprises:
   injecting oxygen into said wave rotor; and
   injecting hydrogen into said wave rotor, thereby initiating a combustion reaction between said oxygen and said hydrogen.

18. A hybrid propulsion system for a marine vessel comprising:
   a fuel cell for powering said marine vessel when a low speed is required by said marine vessel; and
   a wave rotor for powering said marine vessel in combination with said fuel cell when a high speed is required by said marine vessel.

19. The hybrid propulsion system of claim 18, wherein oxygen is injected from an oxygen supply into said wave rotor, and hydrogen is injected from a hydrogen supply into said wave rotor, to initiate a combustion reaction between said oxygen and said hydrogen when said high speed is required by said marine vessel.

20. The hybrid propulsion system of claim 19, wherein high temperature high pressure steam and high temperature low pressure steam are formed by said combustion reaction.

* * * * *